United States Patent
Kemmish et al.

(10) Patent No.: US 6,909,015 B2
(45) Date of Patent: Jun. 21, 2005

(54) AROMATIC POLYETHERKETONES

(75) Inventors: David John Kemmish, Preston (GB); Brian Wilson, Garstang (GB)

(73) Assignee: Victrex Manufacturing Limited, Thornton Cleveleys (GB)

( * ) Notice: Subject to any disclaimer, the term of this patent is extended or adjusted under 35 U.S.C. 154(b) by 68 days.

(21) Appl. No.: 10/203,479

(22) PCT Filed: Feb. 9, 2001

(86) PCT No.: PCT/GB01/00514

§ 371 (c)(1), (2), (4) Date: Nov. 25, 2002

(87) PCT Pub. No.: WO01/58985

PCT Pub. Date: Aug. 16, 2001

(65) Prior Publication Data

US 2003/0130476 A1 Jul. 10, 2003

(30) Foreign Application Priority Data

Feb. 11, 2000 (GB) ............................................. 0003011

(51) Int. Cl.$^7$ ............................................. C07C 65/00
(52) U.S. Cl. ..................................... 562/473; 562/400
(58) Field of Search ................................ 562/473, 400

(56) References Cited

U.S. PATENT DOCUMENTS 4,839,459 A * 6/1989 Darnell et al. .............. 528/220

FOREIGN PATENT DOCUMENTS

| EP | 0 262 920 | 4/1988 |
|---|---|---|
| EP | 0 264 194 | 4/1988 |
| GB | 2 102 442 | 2/1983 |
| GB | 2 116 990 | 10/1983 |
| GB | 2 289 685 | 11/1995 |

OTHER PUBLICATIONS

Colquhoun et al, Polymer, 1988, vol. 29, pp1902–1908.*
Sato et al, Macromolecules (1987), 20, pp. 2675.*
Ueda et al, Polymer Journal (1989), 21 (9) pp. 673.*

Colquhoun et al., Polymer, vol. 29, No. 10, pp. 1902–1908 (1988).

Ueda et al., Polymer Journal (Tokyo), vol. 21, No. 9, pp. 673–679 (1989).

Ueda et al., Macromolecules, vol. 20, No. 11, pp. 2675–2678 (1987).

* cited by examiner

Primary Examiner—Rita Desai
Assistant Examiner—Hector M. Reyes
(74) Attorney, Agent, or Firm—Birch, Stewart Kolasch & Birch, LLP

(57) ABSTRACT

The invention relates to polyetherketones and to a process for the preparation of aromatic polyetherketones which process comprises: a) self-condensing a compound of formula (I) wherein n represents 0 or 1 in the presence of an alkyl or optionally substituted aryl sulphonic acid solvent and in the absence of phosphorous pentoxide; or b) condensing a compound of general formula (II) and a compound of general formula (III) wherein p and q independently represent 0 or 1, in the presence of an alkyl or optionally substituted aryl sulphonic acid solvent and in the absence of phosphorous pentoxide; or c) a combination of a) and b)

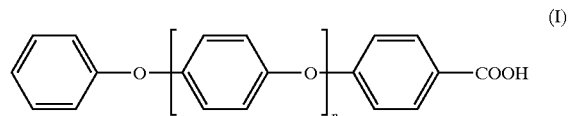

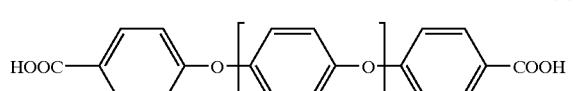

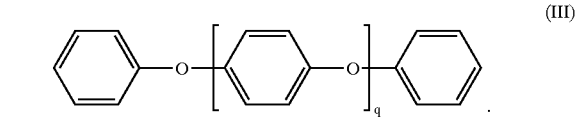

22 Claims, No Drawings

AROMATIC POLYETHERKETONES

This application is the national phase under 35 U.S.C. § 371 of PCT International Application No. PCT/GB01/00514 which has an International filing date of Feb. 9, 2001, which designated the United States of America.

This invention relates to polyetherketones and particularly, although not exclusively, relates to a process for the preparation of aromatic polyetherketones.

Electrophilic routes for the preparation of aromatic polyetherketones are well known and these include direct polycondensation of aromatic discarboxylic acids with aromatic diethers or self-condensation of phenoxybenzoic acids. For example, Ueda and Sato in Macromolecules 1987, 20, 2675 and Ueda and Oda in Polymer Journal vol. 21, No. 9, 673 (1989) describe such condensation reactions using phosphrorous pentoxide/methanesulphonic acid as a condensing agent and solvent. Although polyetherketones can be prepared as described, it has been found that, due to the use of phosphorous pentoxide, the polymer is relatively difficult to recover. Furthermore, phosphorous pentoxide is an unpleasant reagent.

It is an object of the present invention to address the above-described problems.

The invention is based on the discovery that aromatic polyetherketones can be prepared using certain solvents in the absence of phosphorous pentoxide.

According to the invention, there is provided a process for the preparation of an aromatic polyetherketone which process comprises:

a) self-condensing a compound of formula

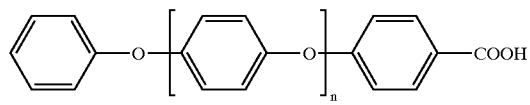

I wherein n represents 0 or 1 in the presence of an alkyl or optionally substituted aryl sulphonic acid solvent and in the absence of phosphorous pentoxide; or b) condensing a compound of general formula

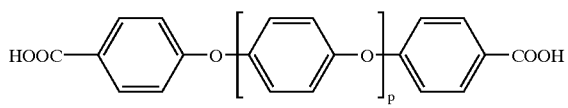

II and a compound of general formula

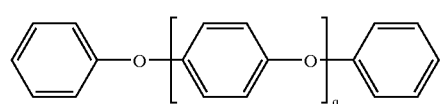

III wherein p and q independently represent 0 or 1, in the presence of an alkyl or optionally substituted aryl sulphonic acid solvent and in the absence of phosphorous pentoxide; or c) a combination of a) and b).

Except where otherwise stated throughout this specification, any alkyl moiety suitably has up to 8, especially up to 6, most preferably up to 4, carbon atoms and may be of straight chain or, where possible, of branched chain structure.

Except where otherwise stated throughout this specification, optional substituents of an aryl, for example a phenyl group include halogen atoms especially fluorine, chlorine, bromine and iodine atoms, and nitro, cyano, alkoxy, hydroxy, amino, alkylamino, sulphinyl, alkylsulphinyl, sulphonyl, alkylsulphonyl, amido, alkylamido, alkoxycarbonyl, haloalkoxycarbonyl and haloalkyl groups. Preferred optional substituents are halogen atoms, especially fluorine and chlorine atoms.

Said sulphonic acid solvent is suitably able to absorb water formed in the polycondensation. Other means for removing water and thereby driving the reaction towards polymer formation may be used in the process. For example, the process may be carried out at an elevated temperature. Preferably, the process is carried out at a temperature of greater than 60° C., more preferably at greater than 80° C. and, especially preferred, at greater than 100° C. In addition to an elevated temperature, an azeotropic means for removing water may be utilised by adding a solvent, for example xylene or toluene or the like to the mixture and heating so that a mixture of water and solvent boil off.

Another means for removing water may comprise directing an inert gas, for example nitrogen gas, into the reaction mixture in order to cause water formed in the reaction to be driven off.

The process is preferably carried out in the absence of any phosphorous-containing reagent. This may ensure that no neutralisation step is required after the polycondensation reaction.

The process is preferably carried out in the absence of any dehydrating agent other than the aforementioned sulphonic acid solvent.

Said solvent is preferably adapted to stabilise the forming polymer, thereby to maintain it in solution so that relatively high molecular weight polymers can be obtained.

Said solvent may be an alkyl or unsubstituted aryl sulphonic acid.

Where said solvent is an alkyl sulphonic acid, it is preferably a $C_{1-4}$ alkyl, more preferably a $C_{1-2}$ alkyl sulphonic acid. An especially preferred solvent is methanesulphonic acid.

Where said solvent is an aryl sulphuric acid, it is preferably optionally substituted, more preferably unsubstituted, benzene sulphonic acid.

Suitably, an aromatic polyetherketone of formula

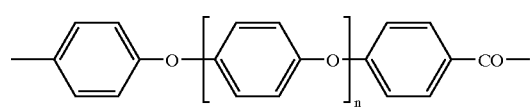

IV

-continued

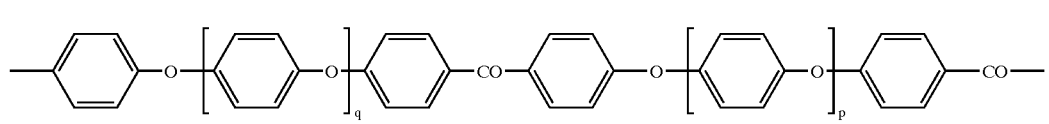

is prepared in processes a, b or c.

In process a), n preferably represents 1.

In processes b) or c), p and q preferably represent 1.

Preferably, said aromatic polyetherketone is prepared by process a) above.

Said aromatic polyetherketone formed in the process is suitably a tough crystalline thermoplastic polymer. It may have an inherent viscosity (IV) of at least 0.7, preferably at least 0.8 and, more preferably, at least 0.9.

In the context of this specification IV is measured at 25° C. on a solultion of polymer in concentrated sulphuric acid of density 1.84 g.cm$_{-3}$, said solution containing 0.1 g of polymer per 100 cm$^3$ of solution.

In the process, said compound of general formula I and said solvent or said compounds of general formulae II and III and said solvent are suitably mixed together under a nitrogen atmosphere at a temperature of greater than 60° C for at least 10 hours and preferably at least 20 hours to form a viscous solution. A minor amount of an end-capping agent, for example an aromatic ether compound such as 1,4-diphenoxybenzene, is suitably included in the mixture.

The ratio of the number of moles of compound of general formula I or the sum of the number of moles of compounds of general formulae II and III to that of the end-capping agent may be in the range 100:1 to 20:1, preferably in the range 75:1 to 35:1.

The viscous solution formed is suitably added in small amounts to water, suitably with stirring. The polymer precipitates and can then be recovered, purified and dried.

Compounds of general formula I, II and III and said solvents are commercially available and/or can be prepared using standard techniques.

The invention extends to an aromatic polyetherketone prepared according to the process described herein.

The invention will now be described by way of example.

EXAMPLE 1

A 3-necked round-bottomed flask, fitted with a condenser arm, a stirrer, a nitrogen sparge and a thermometer, was charged with 4-(4-phenoxyphenoxy)benzoic acid (9.2 g, 30 mmole), 1,4-diphenyoxybenzene (0.157 g, 0.6 mmole) and methanesulphonic acid (100 ml) and stirred under a nitrogen atmosphere at 120° C. for 24 hours. The resulting viscous solution was added dropwise to vigorously stirred water (1 litre). The precipitated polymer was recovered by filtration, stirred in boiling water for 1 hour, filtered, washed with acetone and dried under vacuum at 120° C. for 24 hours. The inherent viscosity (IV) of the polymer was 0.93 measured on a 0.1% solution of the polymer in 95% sulphuric acid at 25° C.

EXAMPLE 2

The process of Example 1 was repeated using benzenesulphonic acid instead of methanesulphonic acid. The resultant polymer had an IV of 0.86.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A process for the preparation of an aromatic polyetherketone which process comprises:

a) self-condensing a compound of the formula

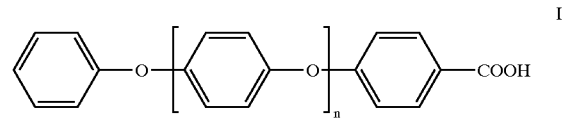

wherein n represents 0 or 1 in the presence of an alkyl sulphonic acid or optionally substituted aryl sulphonic acid solvent and in the absence of phosphorous pentoxide; or b) condensing a compound of the general formula

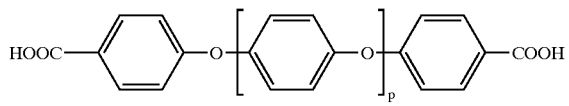

and a compound of the general formula

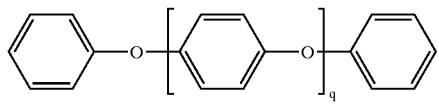

wherein p and q independently represent 0 or 1, in the presence of an alkyl sulphonic acid or optionally substituted aryl sulphonic acid solvent and in the absence of phosphorous pentoxide; or c) a combination of a) and b).

2. A process according to claim 1 wherein said sulphonic acid solvent is able to absorb water formed in the polycondensation.

3. A process according to claim 1 wherein the process is carried out at a temperature of greater than 60° C.

4. A process according to claim 1 wherein the process is carried out at a temperature of greater than 100° C.

5. A process according to claim 1 wherein an azeotropic means for removing water is utilized by adding a solvent and heating so that a mixture of water and solvent boil off.

6. A process according to claim 1 wherein an inert gas is directed into the reaction mixture in order to cause water formed in the reaction to be driven off.

7. A process according to claim 1 wherein the process is carried out in the absence of any phosphorous containing reagents.

8. A process according to claim 1 wherein the process is carried out in the absence of any dehydrating agent other than the said sulphonic acid solvent.

9. A process according to claim 1 wherein said solvent is an alkyl suiphonic acid or unsubstituted aryl sulphonic acid.

10. A process according to claim 1 wherein said solvent is a $C_{1-4}$ alkyl sulphonic acid.

11. A process according to claim 1 wherein said solvent is methanesulphonic acid.

12. A process according to claim 1 wherein said solvent is benzene sulphonic acid.

13. A process according to claim 1 wherein n represents 1.

14. A process according to claim 1 wherein p and q represent 1.

15. A process according to claim 1 wherein an aromatic polyetherketone is prepared by self-condensing a compound of the formula

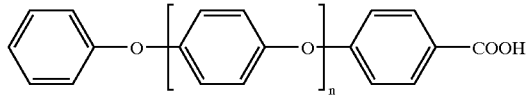

wherein n represents 0 or 1, in the presence of an alkyl or optionally substituted aryl sulphonic acid solvent and in the absence of phosphorous pentoxide.

16. A process according to claim 1 wherein said aromatic polyetherketone formed in the process is a crystalline thermoplastic polymer.

17. A process according to claim 1 wherein said aromatic polyetherketone has an inherent viscosity of at least 0.7.

18. A process according to claim 1 wherein said compound of general formula I and said solvent or said compounds of general formulae II and III and said solvent are mixed together under a nitrogen atmosphere at a temperature of greater than 60° C. for at least 10 hours to form a viscous solution.

19. A process according to claim 1 wherein an end-capping agent is included in the mixture and the ratio of the number of moles of the compound of general formula I or the sum of the number of moles of compounds of general formulae II and III to the number of moles of end-capping agent is in the range 100:1 to 20:1.

20. A process according to claim 19 wherein the end-capping agent is an aromatic ether compound.

21. A process according to claim 19 wherein the end-capping agent is 1,4-diphenoxybenzene.

22. A process according to claim 1 wherein said polyetherketone polymer is precipitated from solution and recovered, purified and dried.

* * * * *